Patented June 3, 1947

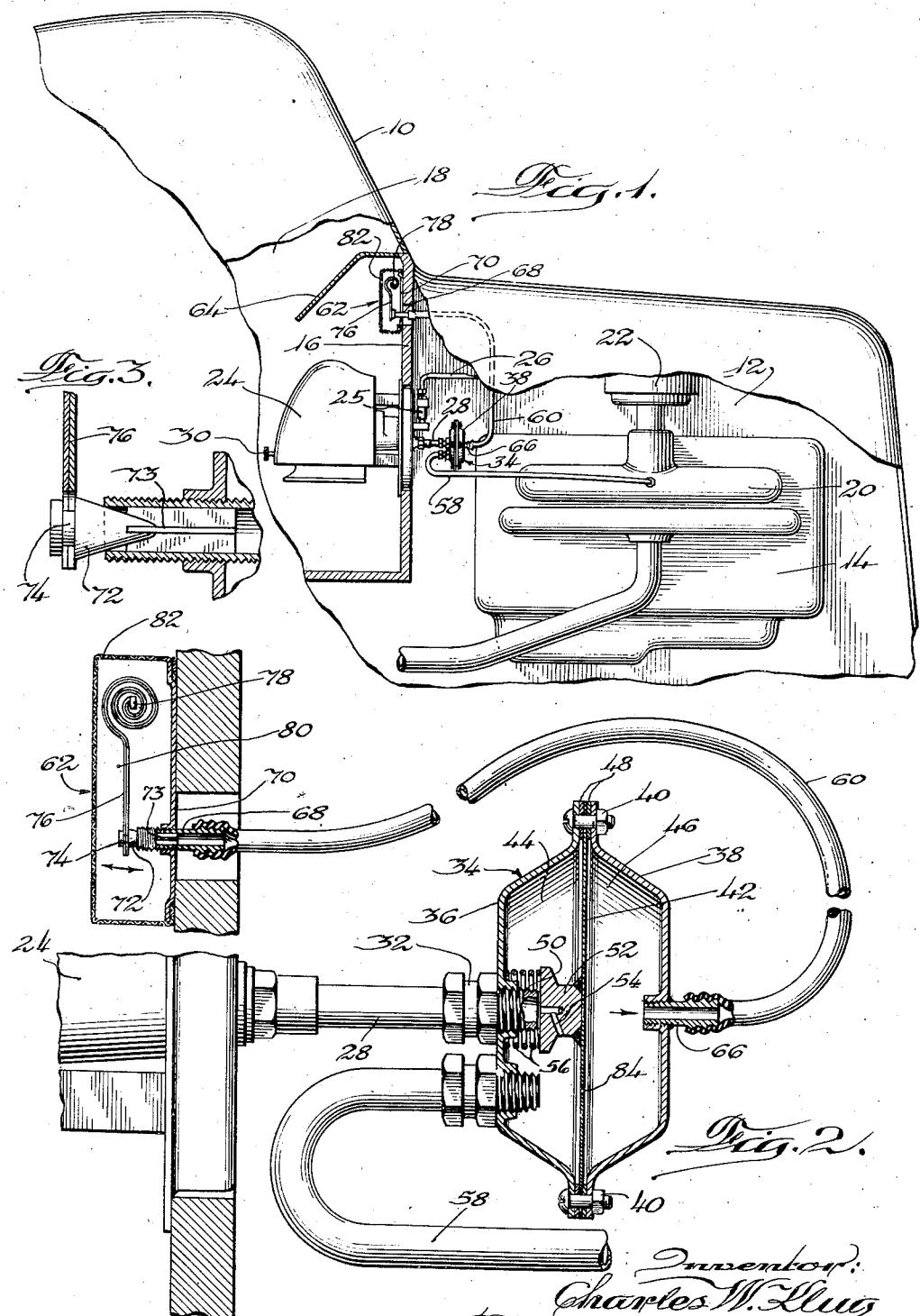

2,421,565

UNITED STATES PATENT OFFICE 2,421,565

HEATER CONTROL

Charles W. Klug, Chicago, Ill., assignor to Stewart-Warner Corporation, Chicago, Ill., a corporation of Virginia Application December 16, 1943, Serial No. 514,457

7 Claims. (Cl. 237—2)

My invention relates to heater controls and more particularly to an automatic temperature responsive control particularly adapted for controlling the internal combustion heaters utilized to heat the passenger compartments of automobiles. In the past several years it has become common to heat the passenger compartments of automobiles by means of internal combustion heaters located in such compartments and receiving fuel from the automobile carburetor or any other suitable source. Such heaters are connected with the intake manifolds of the automobile engines and are ordinarily started or stopped by means of a manually operated push button. In some instances these heaters have been provided with a manual control which affords either a high or low rate of operation, as desired.

It is, of course, common to provide automatic thermostatic controls responsive to temperature variations in a room of a dwelling or other building to regulate the operation of the furnace which heats the building. Such automatic temperature controls, however, are too expensive and are otherwise unsuitable for application to the heaters used on automobiles. Heretofore it has been impractical to control automobile temperatures by temperature responsive mechanisms and this has meant that the driver of the automobile must devote part of his attention to manual regulation of the heater in order to maintain a proper temperature in the passenger compartment of the vehicle.

An object of my invention is to provide a simple and inexpensive automatic temperature control for an automobile heater of the internal combustion type.

Another object of my invention is to provide a new and improved automatic heater control which can be quickly and easily installed on existing types of automobiles.

Another object of my invention is to provide a new and improved heater control which is adapted to be placed in any desired location in the passenger space of the vehicle.

Another object of my invention is to provide a new and improved heater control wherein the exposed part of the control may be made compact and attractive.

Another object of my invention is to provide a new and improved heater control which is substantially free from service difficulties and which will give long and satisfactory service.

Other objects and advantages will become apparent as the description proceeds.

In the drawings:

Fig. 1 is a somewhat diagrammatic view of a part of an automobile to which my invention has been applied;

Fig. 2 is an enlarged view showing the elements of my heater control in section so that the details thereof may be apparent; and Fig. 3 is a view showing a detail of the thermostatic valve.

In Fig. 1 of the drawings I have shown the forward upper part of a conventional automobile 10, having an engine compartment 12 containing the usual internal combustion engine 14 for driving the automobile. This engine compartment is separated by a partition 16 from the passenger compartment 18, in the usual manner. The engine 14 has an intake manifold 20 supplied with a combustible mixture from the usual carburetor 22.

An internal combustion heater 24 is mounted on the partition 16 and extends into the passenger compartment. This heater has a carburetor 25 supplied with fuel through a pipe 26 connected to the float bowl of the engine carburetor 22, or to any other suitable source of fuel. The heater 24 discharges the burned products of combustion through a pipe 28 which is connected with a suitable suction means as hereinafter set forth. In the conventional installation heretofore in use, the discharge pipe is connected directly to the intake manifold of the engine so that the suction in this manifold serves to draw the combustible mixture into the heater and to withdraw the burned products of combustion therefrom. The heater 24 is provided with the usual control button 30, which opens or closes communication between the interior of the heater and the discharge pipe 28, as is well understood in the art. This button 30 also controls the electrical circuits for the fuel igniter and electric fan for circulating air over the heat exchanger element in the usual manner.

Where my novel heater control is utilized, the heater outlet pipe 28 is not connected directly to the engine intake manifold 20, but is connected to a nipple 32 carried by one wall of a housing 34 of a diaphragm valve unit. This diaphragm valve unit has a two part housing, comprising the sheet metal cups 36 and 38 secured together by bolts 40. A diaphragm 42 of sheet metal or other suitable material has its periphery clamped between adjacent edges of the cups 36 and 38 to form a pair of diaphragm chambers 44 and 46. Gaskets 48 are located on each side of the periphery of the diaphragm to prevent communication between the chambers 44 and 46 and atmosphere.

The nipple 32 has a threaded end 50 extending into the chamber 44 and terminating in a seat for a valve 52 attached to the central portion of the diaphragm 42 by brazing, or in any other suitable manner. A restricted passage 54 extends through the valve 52 for a purpose to be hereinafter described. A spring 56 surrounds the threaded end 50 of the nipple 32 and serves to urge the valve 52 and central portion of the diaphragm 42 out of contact with this threaded end. The chamber 44 is connected to the intake manifold 20 by way of a pipe 58.

The chamber 46 of the diaphragm valve unit is connected by a flexible hose 60 to a thermostatic unit, indicated generally by reference character 62 and shown in Fig. 1 as being located on the passenger side of the partition 16, just beneath the usual instrument board 64. It will be understood, however, that this particular location is only one of many possible locations and that the thermostatic unit 62 may be placed in any desired position in the passenger compartment of the vehicle. One end of the hose 60 is telescoped over a metal nipple 66, threaded or otherwise affixed to the cup 38 of the diaphragm valve unit. The other end of the hose 60 is shown as being telescoped over a second metal nipple 68, threaded or otherwise attached to the sheet metal base 70 of the thermostatic unit 62. The nipple 68 has an inwardly projecting end forming a seat for the tapered portion of a needle valve 72 having a cruciform guide portion 73 located well within the nipple and serving to guide movement of this valve axially of the nipple. The valve 72 has a reduced neck 74 which is engaged by the forked lower end of a thermostat 76 which may be inexpensively made of a bi-metallic strip bent into the form clearly shown in the drawings. The fixed end of this bi-metallic strip is attached to a pin 78 mounted in one or both side walls 80 of the thermostatic unit 62. The enclosure of the thermostat is completed by a metal screen 82 which permits free access of air to the thermostat 76 and which may be given any desired finish to increase the attractiveness of the thermostatic unit where this unit is to be located in a position exposed to view.

The needle valve 72 is shown in the drawings as being in a position calling for maximum heater operation, and when the heater control button 30 is moved to operating position, the heater outlet pipe 28 is connected to the intake manifold of the engine by way of chamber 44 and pipe 58, so that a combustible mixture is drawn into the heater and ignited therein by the usual electrical igniter operated from a control circuit closed by shifting the control button 30 to operating position. In the position of the parts shown in the drawings, the diaphragm 42 and valve 52 carried thereby, are held away from the inner end of nipple 32 by the spring 56, with the valve 52 fully opened. The exhaust gases from the heater can therefore flow through pipe 28 and between the end of nipple 32 and valve 52 into chamber 44 which is in open communication with the intake manifold 20 by way of pipe 58. Some of the exhaust gases from the heater may pass through restricted passage 54 in valve 52 in flowing from outlet pipe 28 into chamber 44.

When the thermostat 76 calls for maximum heater operation, the needle valve 72 completely closes the left-hand or inlet end of the nipple 68 so that no air can enter this nipple. The diaphragm 42 is provided with a small bleeder hole 84 which may be of the order of .014", so that the vacuum created in the chamber 44 is communicated by way of this bleeder hole to the chamber 46 and there is substantially no pressure differential across the diaphragm 42. Under these conditions, spring 56 holds the diaphragm in the position shown with the valve 52 spaced from the adjacent end 50 of the nipple 32.

As the temperature in the passenger compartment rises due to heater operation, the lower or free end of the thermostat 76 moves away from the left-hand end of the nipple 68 and moves needle valve 72 to the left as shown in the drawings. The initial movement of this valve will admit only a slight amount of air to the nipple 68 and to chamber 46 connected therewith. This admission of air to chamber 46 will produce a slight pressure differential across the diaphragm 42 which will move the central portion of this diaphragm and valve 52 closer to the threaded end 50 of nipple 32. This will reduce flow of combustible mixtures through the heater and reduce its heat output.

If the reduced heat output of the heater 24 is sufficient to continue the temperature rise in the passenger compartment, thermostat 76 shifts needle valve 72 further to the left and permits a greater flow of air into nipple 68 and chamber 46. This increases the pressure differential across the diaphragm 42 and moves valve 52 closer to the threaded end 50 of the nipple 32, thereby further restricting flow through the heater and further reducing its heat output. Under most conditions of operation, such a reduction in heat output will check the temperature rise in the passenger compartment and produce a rate of heater operation which is just sufficient to maintain a desirable temperature in this compartment. If a window or door is opened, or for some other reason the temperature in the passenger compartment falls, the thermostat 76 will move needle valve 72 toward the right to reduce the air flow into chamber 46, and thereby decrease the pressure differential across the diaphragm 42, whereupon the heater operates at an increased rate.

Where the temperature in the passenger compartment continues to increase despite the corresponding reductions in rate of heater operation produced by shifting of the valve 52 to restrict flow of combustible mixture through the heater, the thermostat 76 moves needle valve 72 to the left a sufficient distance to permit maximum air flow into nipple 68 and chamber 46. This creates a sufficient pressure differential across the diaphragm 42 to move valve 52 into engagement with the threaded end 50 of the nipple 32. Under these conditions, the only communication between the heater outlet pipe 28 and chamber 44 is by way of restricted passage 54 which is preferably made of such size that the heater operates at a minimum rate, just sufficient to maintain heater operation, but insufficient to give off any appreciable amount of heat. As soon as the temperature in the passenger compartment decreases to such a point that additional heat is required, needle valve 72 is shifted toward the right to restrict inflow of air into chamber 46. This decreases the pressure differential across the diaphragm 42 and permits spring 56 to move valve 52 away from engagement with the threaded end 50 of the nipple 32, thereby to increase the flow of combustible mixture through the heater.

From the foregoing description of the operation of my new and improved heater control, it will be apparent that the diaphragm valve is normally open and that the position of this valve at any time during heater operation, accurately responds to the heat requirements of the passenger compartment of the vehicle. With my novel automatic control of flow of combustible mixtures through the heater, it is unnecessary to provide the manual control button 30 with the usual two-step control, and the driver of the automobile need not concern himself with the rate of heater operation, since this rate is automatically controlled by the thermostat 76. This thermostat provides gradual control which normally maintains a substantially uniform temperature in the passenger compartment of the vehicle. The heater is maintained in continuous operation as long as the manual control button 30 is in the operating position, so that on a cold day the driver of the automobile need only shift this button to operating position when he enters the automobile, and move this button to inoperative position when he leaves the automobile.

The screen 82 which encloses the thermostat 76 and needle valve 72, prevents dirt or dust from entering the heater control and interfering with the operation thereof. The diaphragm valve cannot be sealed shut and rendered inoperative for any appreciable length of time by formation of ice thereon, since the restricted passage 54 through this valve permits limited heater operation even if the valve were frozen to the adjacent end 50 of the nipple 32. The exhaust gases from such limited heater operation would quickly melt any ice about the valve 52 and permit this valve to resume its normal operation.

My new and improved heater control also automatically compensates for the reduction in intake manifold vacuum resulting from sudden accelerations of the vehicle. The reduction in intake vacuum accompanying a sudden opening of the throttle valve of the carburetor tends to reduce flow of combustible mixture through the heater. However, this same reduction in vacuum reduces the pressure differential across the diaphragm 42 and permits spring 56 to move the central portion of this diaphragm to the right and thereby increase the opening of the diaphragm valve, thus affording freer communication between the heater outlet pipe 28 and the chamber 44. This increased freedom of communication between pipe 28 and chamber 44 automatically compensates for the reduced vacuum available to draw combustible mixture into and through the heater.

While I have illustrated and described in detail only a single embodiment of my invention, it is to be understood that my invention may assume numerous forms and includes all modifications, variations, and equivalents coming within the appended claims.

I claim:

1. A heater control for controlling an internal combustion automobile heater of the kind operated from an intake manifold of an automobile engine, said control comprising means interposed between said heater and said intake manifold to vary communication therebetween, a thermostat located in the passenger compartment of the vehicle for regulating said first-named means, a pipe connecting said means with said thermostat, and a valve for said pipe operated by said thermostat.

2. A control for an internal combustion heater utilized to heat a passenger compartment of an automobile and having a discharge pipe adapted for connection with a source of suction, said control comprising a housing connected to said pipe, a diaphragm dividing said housing into a pair of chambers, a valve carried by said diaphragm and controlling communication between said pipe and one of said chambers, a second pipe connecting said chamber with a source of suction, a restricted communication between said chambers, an air inlet for said other chamber, and a thermostat controlling admission of air through said inlet.

3. A control for an internal combustion heater utilized to heat a passenger compartment of an automobile and having a discharge pipe adapted for connection with a source of suction, said control comprising a housing connected to said pipe, a diaphragm dividing said housing into a pair of chambers, a valve carried by said diaphragm and controlling communication between said pipe and one of said chambers, a second pipe connecting said chamber with a source of suction, a restricted bypass for said valve, a restricted communication between said chambers, an air inlet for said other chamber, and a thermostat controlling admission of air through said inlet.

4. A control for an internal combustion heater utilized to heat a passenger compartment of an automobile and having a discharge pipe adapted for connection with a source of suction, said control comprising a housing connected to said pipe, a diaphragm dividing said housing into a pair of chambers, a valve carried by said diaphragm and controlling communication between said pipe and one of said chambers, a second pipe connecting said chamber with a source of suction, a restricted communication between said chambers, an air inlet for said other chamber, a needle valve for said inlet, and a thermostat controlling admission of air through said inlet by shifting said needle valve whereby the rate of heater operation may be accurately varied.

5. A heater control for controlling an internal combustion automobile heater of the kind operated from an intake manifold of the automobile engine to heat the passenger compartment of the vehicle, said control comprising a diaphragm unit and a thermostatic unit located in the passenger compartment, said diaphragm unit including a pair of chambers separated by a diaphragm, one of said chambers being connected to the intake manifold, a nipple extending into said chamber and connected to the heater outlet, a valve carried by said diaphragm for engaging said nipple to limit communication between said nipple and said chamber, said valve having a passage therethrough for connecting said nipple with said chamber, said diaphragm having a bleeder hole therein connecting said chambers, a spring for urging said valve out of engagement with said nipple, a conduit connecting said other chamber with said thermostatic unit, a thermostatic element mounted in said thermostatic unit, and a valve operated by said thermostatic element for regulating admission of air to said conduit.

6. A heater control for controlling an internal combustion heater of the kind operated from a source of suction, said control comprising a diaphragm unit and a thermostatic unit, said diaphragm unit including a pair of chambers separated by a diaphragm, one of said chambers being connected to a source of suction and to the heater outlet, a valve operated by said diaphragm to vary communication between said outlet and said chamber, said valve having a passage therethrough for connecting said outlet with said chamber, said diaphragm having a bleeder hole therein connecting said chambers, said valve being biased toward open position, a flexible conduit connecting said other chamber with said thermostatic unit, said last-named unit having a nipple communicating with said conduit, a thermostatic element mounted in said thermostatic unit, and a valve operated by said thermostatic element for regulating admission of air to said nipple.

7. A heater control for controlling an internal combustion automobile heater of the kind operated from an intake manifold of the automobile engine to heat the passenger compartment of the vehicle, said control comprising a diaphragm unit and a thermostatic unit located in the passenger compartment, said diaphragm unit including a pair of chambers separated by a diaphragm, one of said chambers being connected to the intake manifold, a nipple extending into said chamber and connected to the heater outlet, a valve carried by said diaphragm for cooperating with said nipple to vary communication between said nipple and said chamber, said valve having a restricted passage therethrough for connecting said nipple with said chamber, said diaphragm having a bleeder hole therein connecting said chambers, a spring for urging said valve out of engagement with said nipple, a conduit connecting said other chamber with said thermostatic unit, said last-named unit having a nipple communicating with said conduit, a thermostatic element mounted in said thermostatic unit, a valve moved by said thermostat for variably regulating admission of air to said last-named nipple, and a housing comprising a foraminous portion enclosing said thermostatic element and valve while exposing said thermostat to air in said passenger compartment.

CHARLES W. KLUG.

REFERENCES CITED

The following references are of record in the file of this patent:

UNITED STATES PATENTS

| Number | Name | Date |
|---|---|---|
| 1,779,978 | McKee | Oct. 28, 1930 |
| 1,764,799 | Kysor | June 17, 1930 |
| 1,611,554 | Pinkham | Dec. 21, 1926 |
| 430,226 | Easton | June 17, 1890 |
| 2,207,776 | Black | July 16, 1940 |
| 2,300,010 | Rose | Oct. 27, 1942 |
| 2,300,011 | Rose | Oct. 27, 1942 |
| 2,191,174 | McCollum | Feb. 20, 1940 |